United States Patent
Wang et al.

(10) Patent No.: US 12,463,757 B2
(45) Date of Patent: Nov. 4, 2025

(54) AUTOMATIC VISUAL MEDIA TRANSMISSION ERROR ASSESSMENT

(71) Applicant: IMAX CORPORATION, Mississauga (CA)

(72) Inventors: Jiheng Wang, Waterloo (CA); Hojatollah Yeganeh, Waterloo (CA); Kai Zeng, Kitchener (CA); Zhou Wang, Waterloo (CA)

(73) Assignee: IMAX CORPORATION, Mississauga (CA)

( * ) Notice: Subject to any disclaimer, the term of this patent is extended or adjusted under 35 U.S.C. 154(b) by 542 days.

(21) Appl. No.: 17/854,311

(22) Filed: Jun. 30, 2022

(65) Prior Publication Data
US 2023/0010085 A1 Jan. 12, 2023

Related U.S. Application Data

(60) Provisional application No. 63/219,040, filed on Jul. 7, 2021.

(51) Int. Cl.
*H04L 1/24* (2006.01)
*G06N 3/042* (2023.01)
(Continued)

(52) U.S. Cl.
CPC .......... *H04L 1/248* (2013.01); *G06N 3/042* (2023.01); *G06N 3/045* (2023.01); *G06T 7/0002* (2013.01);
(Continued)

(58) Field of Classification Search
CPC ........ G06N 20/10; G06N 3/042; G06N 3/045; G06N 3/0464; G06N 3/084; G06N 3/09;
(Continued)

(56) References Cited

U.S. PATENT DOCUMENTS

| 2004/0170330 A1* | 9/2004 | Fogg | ........................ H04N 5/21 |
| | | | 375/E7.113 |
| 2008/0273861 A1* | 11/2008 | Yang | .................... H04N 17/004 |
| | | | 386/259 |

(Continued)

FOREIGN PATENT DOCUMENTS

WO  2020085781 A1  4/2020

OTHER PUBLICATIONS

Jean Begaint, "Towards novel inter-prediction methods for image and video compression," Dec. 19, 2018, HAL open science, Rennes 1, 2018. English, NNT, pp. 8-10, 20-30 and 40-46.*

(Continued)

*Primary Examiner* — Omar S Ismail
(74) *Attorney, Agent, or Firm* — BROOKS KUSHMAN P.C.

(57) ABSTRACT

A method or system is disclosed to assess transmission errors in a visual media input. Domain knowledge is obtained from the visual media input by content analysis, codec analysis, distortion analysis, and human visual system modeling. The visual media input is divided into partitions, which are passed into deep neural networks (DNNs). The DNN outputs of all partitions are combined with the guidance of domain knowledge to produce an assessment of the transmission error. In one or more illustrative examples, transmission error assessment at a plurality of monitoring points in a visual media communication system is collected and assessed, followed by quality control processes and statistical performance assessment on the stability of the visual communication system.

36 Claims, 11 Drawing Sheets

(51) Int. Cl.
  *G06N 3/045* (2023.01)
  *G06T 7/00* (2017.01)
  *G06V 10/764* (2022.01)
  *G06V 10/82* (2022.01)

(52) U.S. Cl.
  CPC ............ *G06V 10/764* (2022.01); *G06V 10/82* (2022.01); *G06T 2207/10016* (2013.01); *G06T 2207/20021* (2013.01); *G06T 2207/20048* (2013.01); *G06T 2207/20084* (2013.01); *G06T 2207/30168* (2013.01)

(58) Field of Classification Search
  CPC ........ G06N 3/0985; G06T 2207/10016; G06T 2207/10024; G06T 2207/20021; G06T 2207/20048; G06T 2207/20081; G06T 2207/20084; G06T 2207/30168; G06T 7/0002; G06V 10/764; G06V 10/82; G06V 20/41; H04L 1/248
  See application file for complete search history.

(56) References Cited

U.S. PATENT DOCUMENTS

| | | | | |
|---|---|---|---|---|
| 2016/0088287 A1* | 3/2016 | Sadi | ............... | H04N 13/117 348/43 |
| 2018/0240221 A1* | 8/2018 | Rijnders | ............... | H04N 19/149 |
| 2018/0376153 A1* | 12/2018 | Gokhale | ............... | H04N 19/147 |
| 2019/0236394 A1* | 8/2019 | Price | ............... | G06V 10/945 |
| 2020/0074154 A1* | 3/2020 | el Kaliouby | ............... | G06V 40/171 |
| 2020/0210824 A1* | 7/2020 | Poornaki | ............... | G05B 23/0221 |
| 2020/0260083 A1* | 8/2020 | Helmrich | ............... | H04N 19/176 |
| 2020/0329233 A1* | 10/2020 | Nemirofsky | ............... | H04N 19/136 |
| 2021/0133981 A1* | 5/2021 | Chen | ............... | G06T 7/11 |
| 2021/0203157 A1* | 7/2021 | Visweswariah | ............... | H02J 3/001 |
| 2021/0203951 A1* | 7/2021 | Kottke | ............... | H04N 19/179 |
| 2021/0266781 A1* | 8/2021 | Alkurd | ............... | H04L 41/147 |

OTHER PUBLICATIONS

Dandan Ding et al., "Advances in Video Compression System Using Deep Neural Network: A Review and Case Studies," Mar. 4, 2021, Proceedings of the IEEE | vol. 109, No. 9, Sep. 2021, pp. 1494-1510.*

Wei Sun et al.,"Deep Learning Based Full-Reference and No. Reference Quality Assessment Models for Compressed UGC Videos," Jun. 21, 2021,2021 IEEE International Conference on Multimedia & Expo Workshops (ICMEW), pp. 1-5.*

Kongfeng Zhu et al., "No-Reference Video Quality Assessment Based on Artifact Measurement and Statistical Analysis," Apr. 2, 2015, IEEE Transactions on Circuits and Systems for Video Technology, vol. 25, No. 4, Apr. 2015, pp. 533-542.*

Andre Nortje, "Deep Image and Video Compression," Mar. 2020, Doctoral thesis Electronic Engineering at Stellenbosch University, pp. 40-67.*

Wentao Liu et al.,"End-to-End Blind Quality Assessment of Compressed Videos Using Deep Neural Networks," Oct. 15, 2018, MM '18: Proceedings of the 26th ACM international conference on Multimedia, pp. 1-6.*

Fazliani et al., "Learning Based Hybrid No-Reference Video Quality Assessment of Compressed Videos", 2019 IEEE International Symposium on Circuits and Systems (ISCAS), 2019, 5 pages.

Giannopoulos et al., "Convolutional Neural Networks for Video Quality Assessment", ARXIV.org, Cornell University Library, Sep. 27, 2018, 12 pages.

Khan et al., "An ANFIS-Based Hybrid Video Quality Prediction Model for Video Streaming over Wireless Networks", The Second International Conference on Next Generation Mobile Applications, Services, and Technologies, IEEE, 2008, 6 pages.

Liu et al., "End-to-End Blind Quality Assessment of Compressed Videos Using Deep Neural Networks", Multimedia, ACM, Oct. 22-26, 2018, 9 pages.

Sun et al., "Deep Learning Based Full-Reference and No-Reference Quality Assessment Models for Compressed UGC Videos", 2021 IEEE International Conference on Multimedia and Expo Workshops (ICMEW), 2021, 6 pages.

Zhu et al., "No-Reference Video Quality Assessment Based on Artifact Measurement and Statistical Analysis", IEEE Transactions on Circuits and Systems for Video Technology, Apr. 2015, vol. 25, No. 4, 14 pages.

* cited by examiner

AUTOMATIC VISUAL MEDIA TRANSMISSION ERROR ASSESSMENT

CROSS-REFERENCE TO RELATED APPLICATIONS

This application claims the benefit of U.S. provisional application Ser. No. 63/219,040 filed Jul. 7, 2021, the disclosure of which is hereby incorporated in its entirety by reference herein.

TECHNICAL FIELD

Aspects of the disclosure generally relate to detecting and assessing errors that occur in the process of transmission, encoding and decoding of visual media such as images and videos.

BACKGROUND

In modern visual communication systems, visual media contents including images and videos are compressed and transmitted over a wide variety of communication channels and networks. Commonly used methods for compression include image/video coding standards and open-source video encoding tools such as JPEG, JPEG2000, MPEG-1, MPEG-2, MPEG-4, H.261, H.263, H.264/AVC, H.265/HEVC, VPx, AVSx, Dirac, Sorenson, ProRes, Motion-JPEG, WMV, RealVideo, Theora, VC-x, AV1, VVC, EVC, and LCEVC. Transmission errors may occur in any stage of the visual communication process. For example, almost all analog/digital wired/wireless communication channels and networks are error-prone, where signal waveforms may be distorted, digital bits may be flipped, and networking packets may be lost. For another example, errors may also occur in the encoding, decoding, storage, buffering, rebuffering processes. All of such errors that lead to alternation of the visual media signals anywhere between the senders and receivers in a communication system are referred to as transmission errors.

Transmission errors often lead to severe visual artifacts and quality degradations in the visual media content presented at the final receivers' viewing devices. For example, an error in a single bit in a compressed video stream could lead to loss or misinformation of a whole video block, and the error could further propagate to consecutive blocks and video frames, leading to extremely annoying artifacts in large areas of an image or across many video frames. The visual appearance of such errors in decoded images and video frames may be severe blockiness, missing pixels and blocks, stripes, blur, false content, false contours, floating content, ghosting effect, and many other arbitrary shapes, textures and artifacts. Automatic detection of transmission errors accurately and efficiently is important in assessing the viewer experience, capturing the error events, localizing the problems, fixing the problems, and maintaining and improving the reliability and robustness of visual communication systems.

Transmission error may be detected using different approaches, for example, by employing error control coding [1] or packet loss detection method [2] to assess the percentages of error bits or missing packets, by utilizing full-reference image/video quality assessment methods [3], [4], [5], or by using blocking or other artifact detection approaches [6]. However, none of these give precise assessment on the viewer experiences of transmission errors. Specifically, the percentage of error bits or missing packets is not necessarily correlated well with the perceptual quality of decoded image/video frames perceived by end users [7], and errors in the process of encoding and decoding are not detected. Full-reference image/video quality assessment methods are often not applicable because the original image/video is generally not available at the receiver/viewer side as a reference to assess the quality of decoded image/video frames on end users' viewing devices. Blocking and other artifact detection approaches are often incapable of differentiating transmission errors and distortions created in the video compression and processing processes. Therefore, there is a strong need of efficient methods that can detect transmission errors in visual media content automatically.

SUMMARY

In one or more illustrative examples, a method or system for assessing transmission errors in a visual media input is disclosed that includes obtaining domain knowledge from the visual media input by content analysis, codec analysis, distortion analysis, and/or human visual system (HVS) modeling, dividing the visual media input into partitions such as 2D or 3D blocks, passing each partition into deep neural networks (DNNs), and combining DNN outputs of all partitions with domain knowledge to produce an assessment of the transmission errors in the visual media input. In one or more illustrative examples, transmission error assessment at a plurality of monitoring points in a visual media communication system is collected, followed by quality control processes and statistical performance assessment of the visual communication system.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
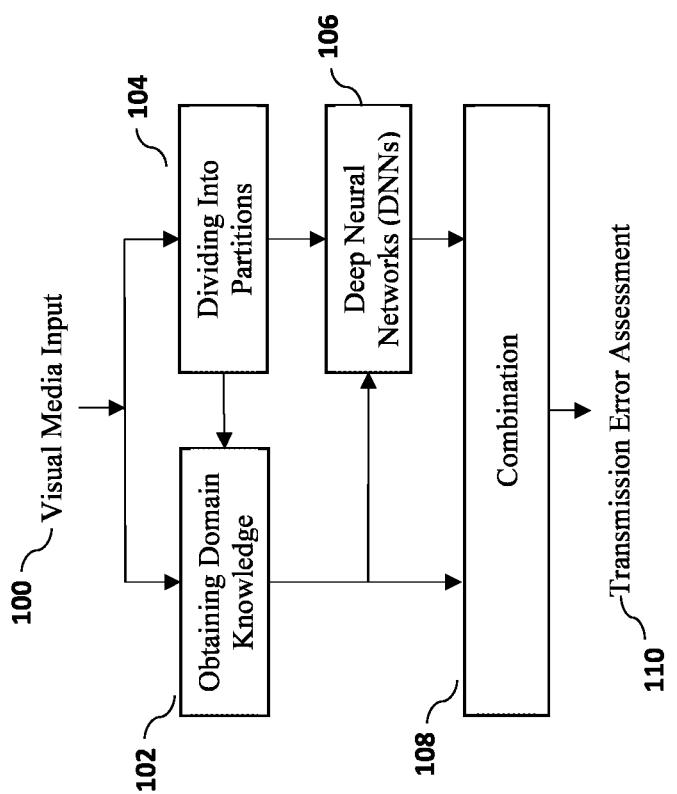
FIG. 1 illustrates the framework and data flow diagram for the assessment of transmission error of a visual media input, in accordance with an embodiment of the disclosure.

FIG. 1 illustrates the framework and data flow diagram for the assessment of transmission error of a visual media input 100, in accordance with an embodiment of the disclosure. The visual media input 100 may be a still image or a video sequence containing many frames per second with one or more color channels. It may also be visual content in other formats such as stereo content, omnidirectional image/video content or point cloud content. The visual media input 100 may be in raw pixel format and may also be in compressed bit stream format, for example, being compressed by one or more of the following image/video coding standards and open-source video encoding tools such as JPEG, JPEG2000, MPEG-1, MPEG-2, MPEG-4, H.261, H.263, H.264/AVC, H.265/HEVC, VPx, AVSx, Dirac, Sorenson, ProRes, Motion-JPEG, WMV, RealVideo, Theora, VC-x, AV1, VVC, EVC, and LCEVC. The visual media input 100 may contain transmission errors, which may occur in any stage of the visual communication process. For example, almost all analog/digital wired/wireless communication channels and networks are error-prone, where signal waveforms may be distorted, digital bits may be flipped, and packages may be lost. For another example, errors may also occur in the encoding, decoding, storage, buffering, rebuffering processes. All of such errors that lead to alternation of the image/video signals are referred to as transmission errors. The visual media input 100 contains such errors either in the raw pixel format or compressed bit streams, thus when it is fully decoded to raw pixels and presented on a viewing device, may exhibit severe visual artifacts.

In accordance with an embodiment of the disclosure, the visual media input 100 is analyzed for obtaining domain knowledge 102 about the visual media input, which may include the content of the visual media input, the encoder/decoder (codec) used for compression and stream representation of the visual media input, the distortion in the visual media input, and the human visual system (HVS) modeling that captures the visual perception characteristics when the visual media input is perceived by human observers. The visual media input is also divided into partitions 104. The partition may be performed on image/video pixels spatially at each image or video frame into blocks of square, rectangular or other shapes. The partition may also be performed on image/video pixels both spatially (within a video frame) and temporally (across multiple video frames along the time dimension) into three-dimensional blocks of square or rectangular prisms. The partition may also be performed in a multi-channel representation by first applying a multi-scale, multi-orientation decomposition transform and then dividing the visual media input in the transform domain. The multi-channel representation may be a two-dimensional or three-dimensional transform, for example, the Fourier transforms, the discrete cosine transform, the wavelet transform, the Gabor transform, the Laplacian pyramid transform, the Gaussian pyramid transform, and the steerable pyramid transform to perform the multi-scale multi-orientation decomposition transform. The partition may then be performed in the transform domain. For example, in the wavelet transform domain, the partitions may be blocks of square, rectangular or other shapes in two-dimensional wavelet subbands, and may be three-dimensional blocks of square or rectangular prisms or other shapes in three dimensions composed of two-dimensional wavelet subbands plus a temporal time dimension across wavelet transform subbands of multiple video frames. Deep neural networks (DNNs) 106 of one or multiple types are applied to the partitions for transmission error assessment of the particular partitions. The outputs of all DNNs are combined 108 with the guidance of the domain knowledge, to produce an overall transmission error assessment 110.

Figure 2:
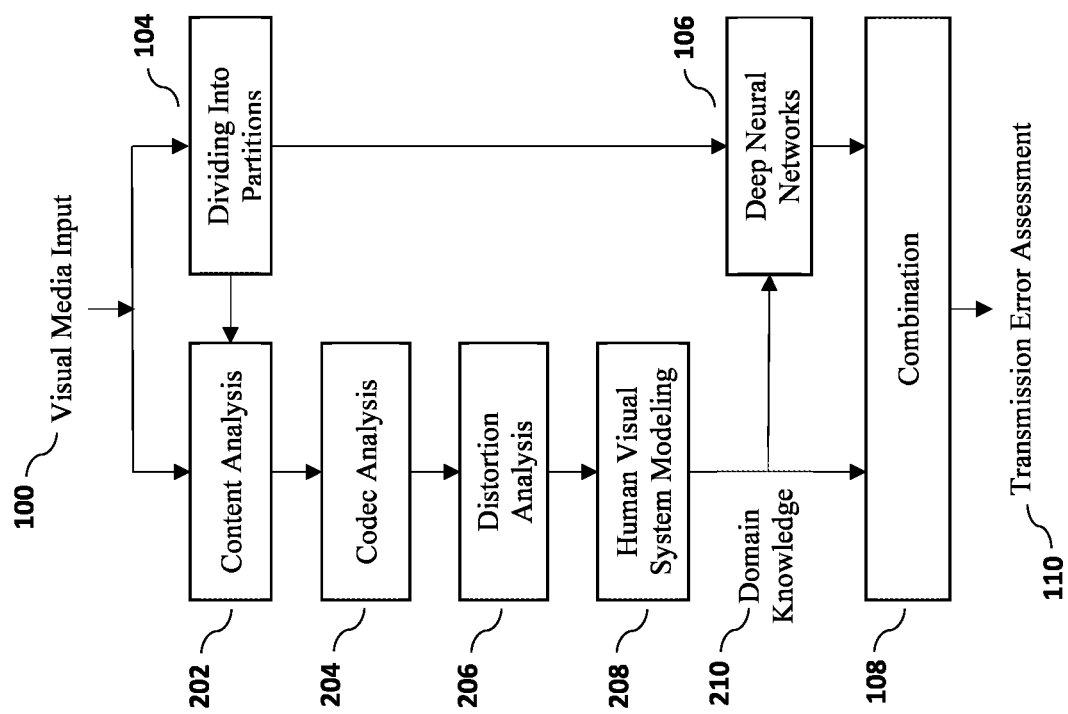
FIG. 2 illustrates the framework and data flow diagram for the assessment of transmission error of a visual media input, where the domain knowledge is obtained by analyzing the visual media input with the processes of content analysis, codec analysis, distortion analysis and HVS modeling, in accordance with an embodiment of the disclosure.

In accordance with an embodiment of the disclosure, the process in obtaining domain knowledge 102 about the visual media input 100 may be further divided into several interchangeable steps as shown in operations 202, 204, 206, 208 in FIG. 2, and then be aggregated to the collection of domain knowledge 210.

In accordance with an embodiment of the disclosure, the steps in obtaining domain knowledge 102 may include content analysis 202 by classifying the visual media input into different content type categories and/or complexity categories. The content type categories may be determined in different ways. In one embodiment, the visual media input may be classified based on genres such as action, comedy, drama, fantasy, horror, mystery, thriller, romance and etc. In another embodiment, the visual media input may be classified to animation, movie, sport, talking head, and etc. In yet another embodiment, the visual media input may be categorized based on the media generation processes, such as computer generated imagery versus camera shot and realistic content. In yet another embodiment, the visual media input may be classified into standard dynamic range (SDR) and high dynamic range (HDR) categories. In yet another embodiment, the visual media input may be classified into standard color gamut and (SCG) wide color gamut (WCG) categories. In yet another embodiment, in the case of HDR content, the visual media input may be classified based on the content production, transmission and display pipelines into HLG, HDR10, HDR10+, DolbyVision categories. The visual media input may be classified into a discrete number of complexity categories, or be given a scalar complexity score, or be given a vector-valued assessment containing multiple complexity measures. In one embodiment, the complexity may be assessed in both spatial and temporal domain such as spatial complexity, spatial information, temporal complexity and temporal information.

The steps in obtaining domain knowledge 102 may also include codec analysis 204 by classifying the visual media input into different encoder categories, depending on which encoder type has been used to represent the bit stream of visual media input. In one embodiment, the encoder categories may include two or more of JPEG, JPEG2000, MPEG-1, MPEG-2, MPEG-4, H.261, H.263, H.264/AVC, H.265/HEVC, VPx, AVSx, Dirac, Sorenson, ProRes, Motion-JPEG, WMV, RealVideo, Theora, VC-x, AV1, VVC, EVC, and LCEVC. In one embodiment, the encoder category may be determined from the header or syntax of the compressed bit stream of the visual media input. In another embodiment, the encoder category may be determined by a classifier that takes the fully decoded raw pixels of the visual media input, and produces a classification result as the output. In one embodiment, the classifier may include a feature extraction step that reduces the dimensions of the visual media input, followed by a classifier built in the feature space. In another embodiment, the classifier may be a neural network that takes the raw pixels of the visual media input as input and produce a classification results in an end-to-end manner.

The steps in obtaining domain knowledge 102 may also include distortion analysis 206 by classifying the visual media input into different distortion categories based on the distortion types and/or levels of the visual media input. In one embodiment, the visual media input may be classified into distortion type categories that may include one or more of spatial artifacts, temporal artifacts, blurring, blocking, ringing, basis pattern effect, color bleeding, flickering, jerkiness, floating, mosaicking effect, staircase effect, false edge effect, mosquito noise, fine-granularity flickering, coarse-granularity flickering, texture floating, and edge neighborhood floating. In another embodiment, the visual media input may be classified into a distortion level categories, or be given a scalar distortion level score, or be given a vector-valued assessment containing multiple measures of distortion levels, each corresponding to a different distortion type.

Figure 3:
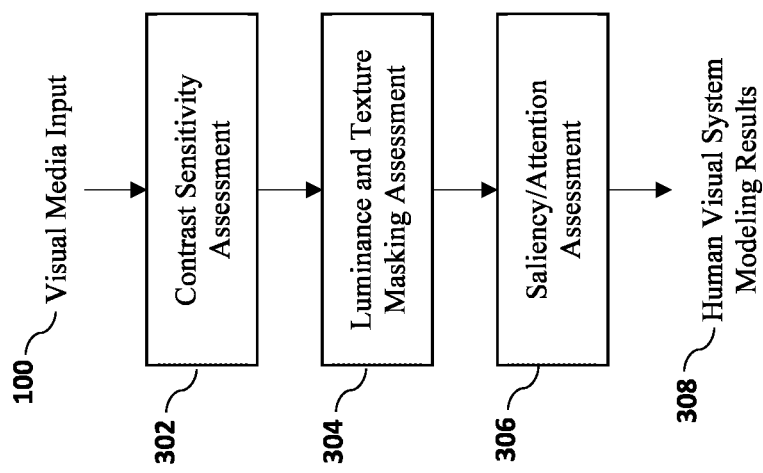
FIG. 3 illustrates the framework and data flow diagram for HVS modeling on the visual media input that includes visual contrast sensitivity assessment, luminance and texture masking effect assessment, and visual saliency and attention assessment, in accordance with an embodiment of the disclosure.

As shown in FIG. 3, the steps in obtaining domain knowledge 102 may also include HVS modeling 208 by assessing the visual media input in terms of human visual contrast sensitivity 302, luminance and texture masking effects 304, and/or visual saliency and attention effects 306, and produce the overall HVS modeling results 308. The contrast sensitivity function (CSF) 302 measures the contrast, signal, or error sensitivity or visibility by the HVS as a function of spatial and temporal frequencies. In one embodiment, the CSF modeling may be implemented by filtering in the spatial, frequency (by ways of Fourier or Discrete Cosine Transforms), or wavelet (by way of wavelet transform) domains. The visual luminance masking measures the visibility variation of signals due to surrounding luminance levels. The visual texture masking (or sometimes termed as contrast masking) measures the reduction of error/artifact/distortion visibility due to the strength and contrast of signals that are neighbors in the sense that such signals are nearby in terms of spatial and temporal location, spatial and temporal frequency, and texture structure and orientation. In one embodiment, human visual luminance and texture masking effects 304 may be implemented by normalizing the visual input signals by the luminance and energy of its surrounding signals. The HVS model may also incorporate visual saliency and attention assessment 306, which estimates the likelihood/probability of each spatial and temporal location in the video that will attract visual attention and fixations. In one embodiment, the HVS modeling 208 may be performed at partition, frame, time segment and global levels. In another embodiment, the HVS modeling 208 may be incorporated with distortion analysis 206 to compute visual visibilities of specific artifacts as measured in the distortion analysis operation. In another embodiment, the HVS modeling results 308 may be in the forms of spatial or spatiotemporal maps that indicate at each spatial and/or temporal location the sensitivity or visibility of signals/errors/artifacts, and the likelihood of visual attention or fixation.

Figure 4:
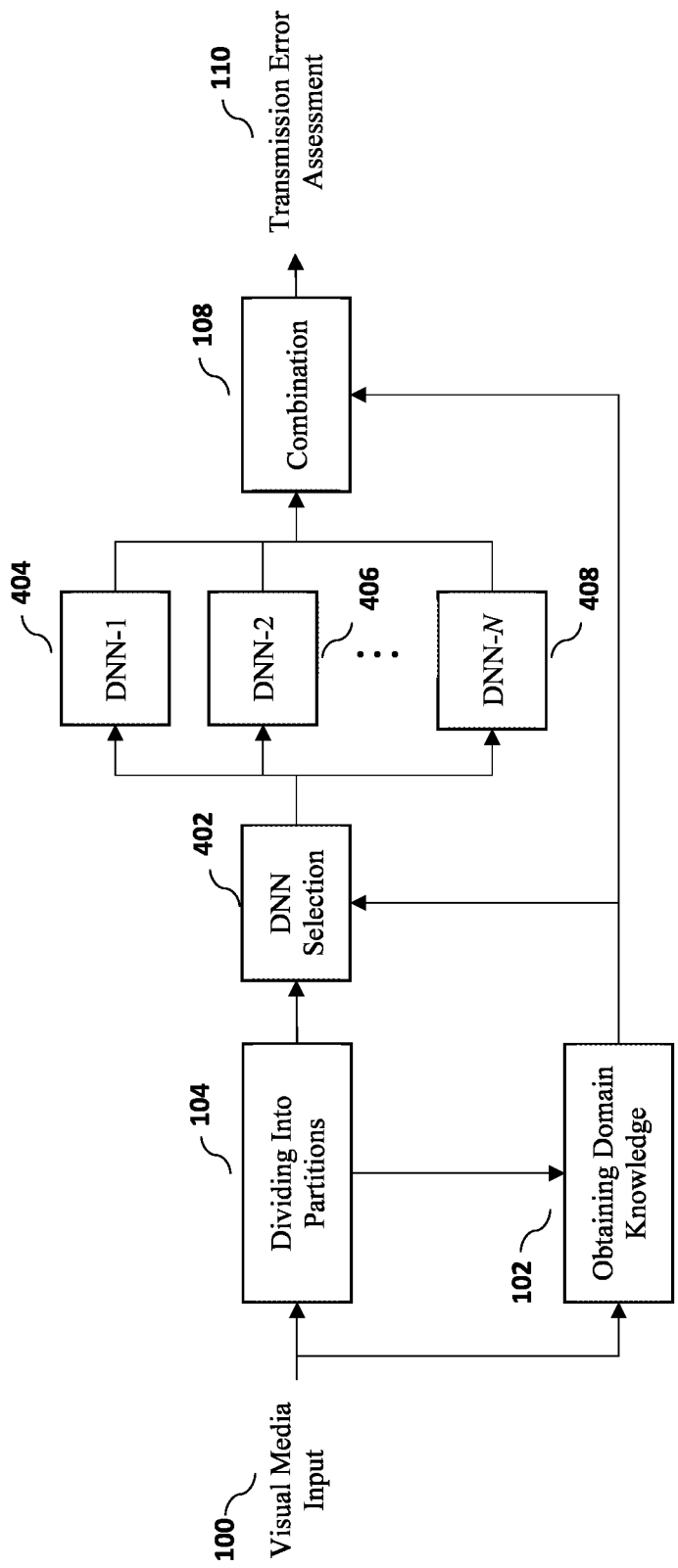
FIG. 4 illustrates the framework and data flow diagram for the assessment of transmission error of a visual media input, where domain knowledge obtained from the visual media input is utilized to select the DNN to be applied to partitions of the visual media input, in accordance with an embodiment of the disclosure.
Figure 5:
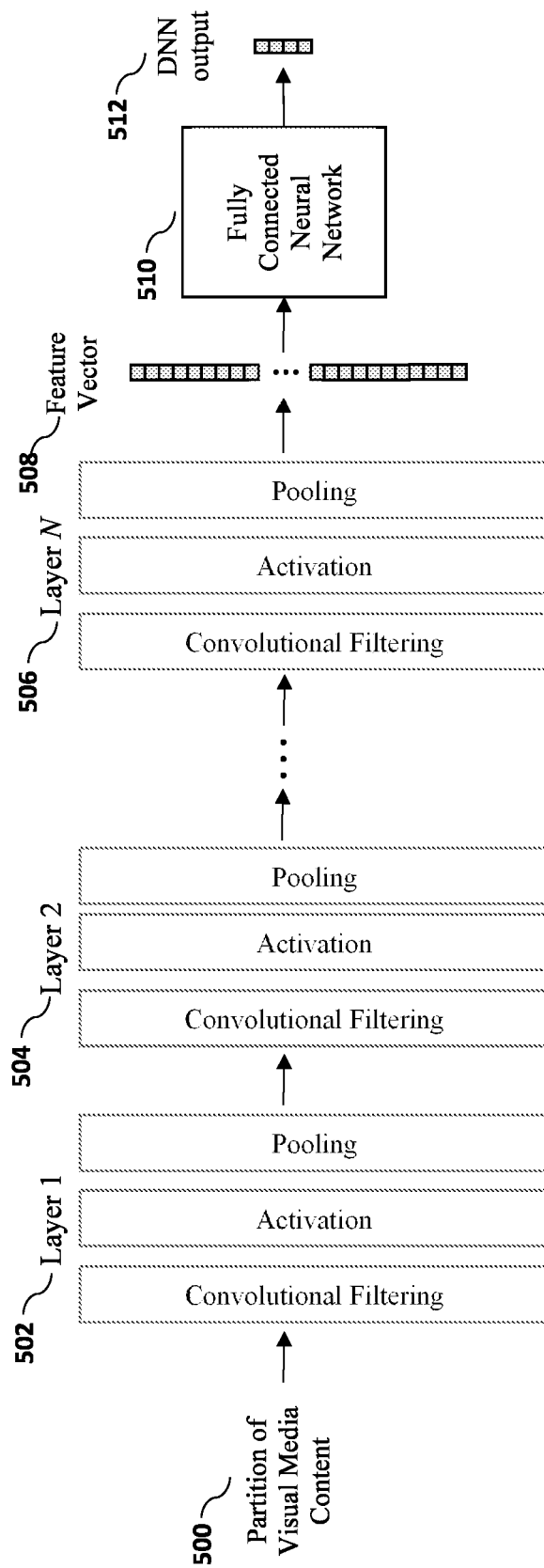
FIG. 5 illustrates an example of DNN architecture, in accordance with an embodiment of the disclosure.

In accordance with an embodiment of the disclosure, a plurality of deep neural networks (DNNs) 404, 406, 408 are constructed, the domain knowledge 102, 210 is used to select one DNN 402 of the best match for each partition 104 of the visual media input 100, and the domain knowledge 102, 210 is used to guide the combination 108 of all DNN output of all partitions 104 to produce a final transmission error assessment output 110, as shown in FIG. 4. The DNN may take different architectures such as multilayer perceptron (MLP), convolutional neural network (CNN), and recurrent neural network (RNN). In one embodiment of the disclosure, a DNN architecture is used, as shown in FIG. 5. The input to the DNN is a partition 500 of the visual media input. The first part of the DNN contains multiple convolutional layers 502, 504, 506. In each layer, a plurality of spatial or spatiotemporal convolutional linear filters are applied, followed by a non-linear activation function and a pooling process. The coefficients that define the filters are the weights of the convolutional layers. Examples of the activation functions include Step, Ramp, Softmax, Tanh, Rectified Linear Unit (ReLU), Sigmoid and generalized divisive normalization (GDN) functions. The pooling operation may be applied to reduce the dimensionality of the signal. Examples of the pooling methods include mean pooling, max pooling, power-average pooling, or adaptive-average/max pooling. The output of the last convolutional layer is reorganized to a feature vector 508, which is fed into a fully connected neural network (FCN) 510 to produce the DNN output 512. The connection strengths between layers of nodes in the FCN are also called the weights of the FCN. The weights of the convolutional layers and the FCN may be trained jointly by back-propagation of a loss function applied at the network output. Examples of the loss function may be defined based on quality or distortion metrics of the visual media input, maximum likelihood, and cross entropy. After training, the DNN may be applied to any partition of the visual media input to produce an output. Depending on the nature of the training data, including the partitions used for training and the ground truth labels given to the partitions (for example, level of transmission error, or level of perceptual artifact of a specific kind), the trained DNN may be used to make corresponding predictions to future novel partitions unseen in the training data.

Figure 6:
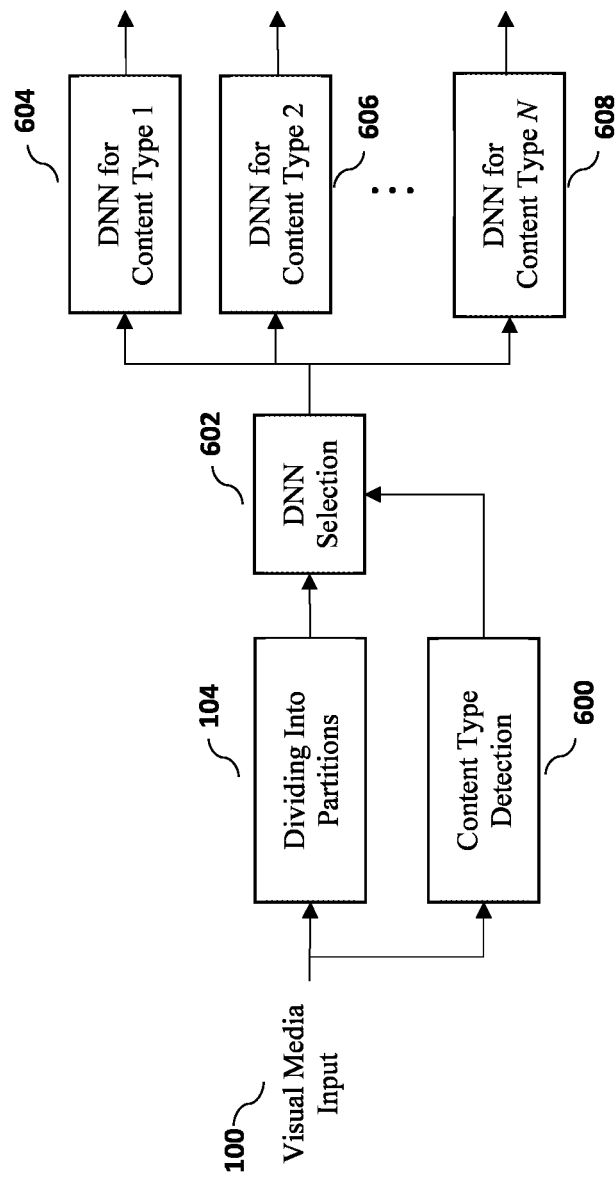
FIG. 6 illustrates the framework and data flow diagram for the assessment of transmission error of a visual media input, where the content type of the visual media input is detected and utilized to select the DNN to be applied to partitions of the visual media input, in accordance with an embodiment of the disclosure.

In accordance with another embodiment of the disclosure, a plurality of DNNs 604, 606, 608 are constructed, each for one or more specific content types, as illustrated in FIG. 6. The content analysis 202 operation in the process of obtaining domain knowledge 102 includes a content type detection operation 600 that classifies the visual media input into different content type categories and/or complexity categories. The classification results are used by a DNN selection operation 602 to select one from a plurality of DNNs 604, 606, 608 that best matches each partition 104 of the visual media input 100.

Figure 7:
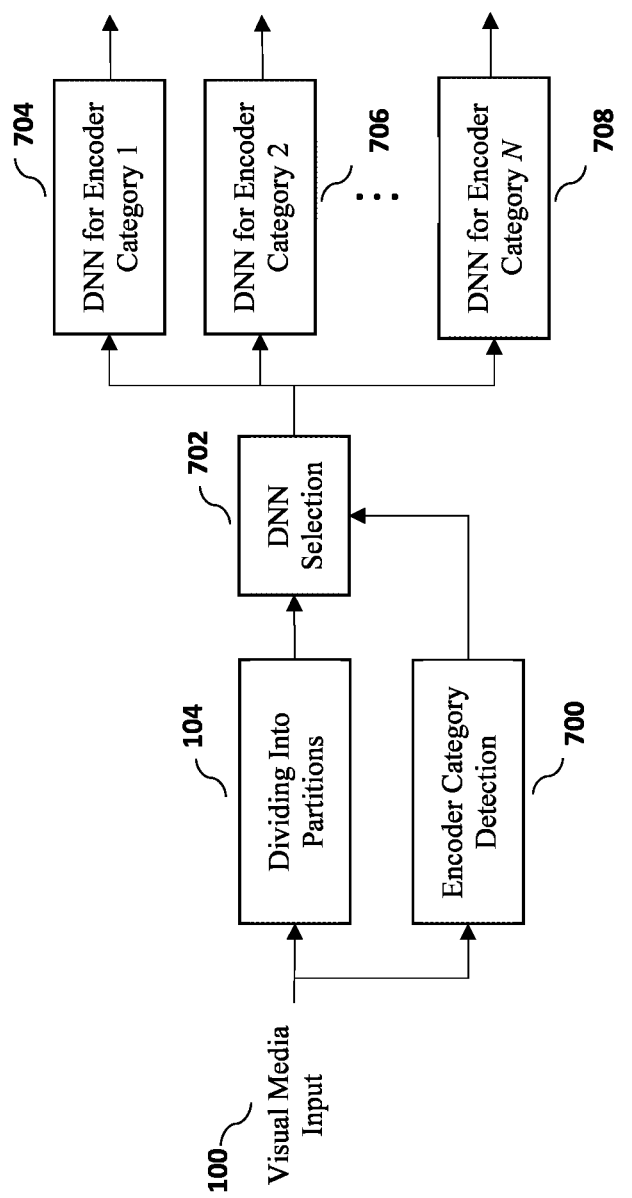
FIG. 7 illustrates the framework and data flow diagram for the assessment of transmission error of a visual media input, where the encoder category of the visual media input is detected and utilized to select the DNN to be applied to partitions of the visual media input, in accordance with an embodiment of the disclosure.

In accordance with another embodiment of the disclosure, a plurality of DNNs 704, 706, 708 are constructed, each for one or more specific encoder categories, as illustrated in FIG. 7. The codec analysis 204 operation in the process of obtaining domain knowledge 102 includes an encoder category detection operation 700 that classifies the visual media input into different encoder categories, depending on which encoder type has been used to represent the bit stream of visual media input. The classification results are used by a DNN selection operation 702 to select one from a plurality of DNNs 704, 706, 708 that best matches each partition 104 of the visual media input 100.

Figure 8:
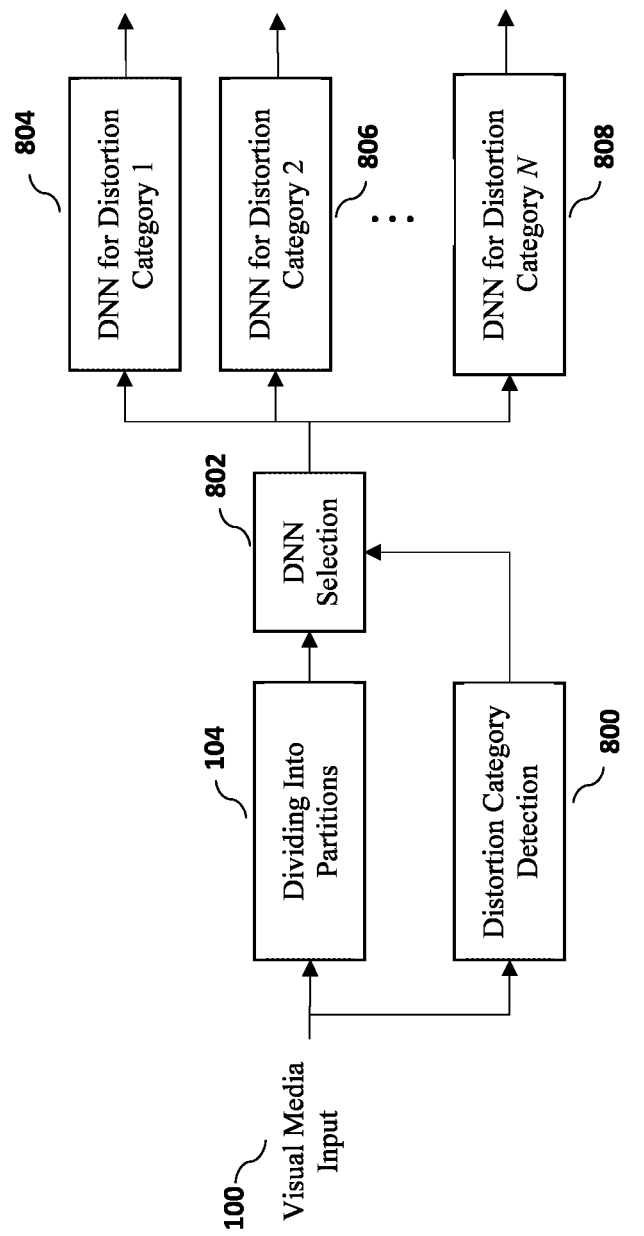
FIG. 8 illustrates the framework and data flow diagram for the assessment of transmission error of a visual media input, where the distortion category of the visual media input is detected and utilized to select the DNN to be applied to partitions of the visual media input, in accordance with an embodiment of the disclosure.

In accordance with another embodiment of the disclosure, a plurality of DNNs 804, 806, 808 are constructed, each for one or more specific distortion categories, as illustrated in FIG. 8. The distortion analysis 206 operation in the process of obtaining domain knowledge 102 includes a distortion category detection operation 800 that classifies the visual media input and its partitions into different distortion categories based on the distortion types and/or levels of the visual media input and its partitions. The classification results are used by a DNN selection operation 802 to select one from a plurality of DNNs 804, 806, 808 that best matches each partition 104 of the visual media input 100.

In accordance with an embodiment of the disclosure, the DNN outputs of all partitions are combined to produce an overall assessment of the transmission errors in the visual media input 100. The combination may be computed in many ways such as using average, weighted average, median, percentile, order statistics weighted averaging, rank percentage average, Minkowski summation, polynomial combination, product of exponentials, feedforward neural network (FNN), or support vector regression (SVR). In one embodiment, the combination may be guided by the domain knowledge 210, 906. In yet another embodiment, the HVS modeling of the visual media input at partition, frame, time-segment and global levels in terms of human visual contrast sensitivity, luminance and texture masking effects, and/or visual saliency and attention, as the weighting and preference factors in the combination method. In yet another embodiment, weighted averaging may be applied, where the weights may be determined by HVS modeling 208 and distortion analysis 206, specifically by the spatial or spatiotemporal maps that indicate at each spatial and/or temporal location the sensitivity or visibility of signals/errors/artifacts, and the likelihood of visual attention or fixation. In yet another embodiment, the levels of transmission error predicted by DNN outputs of all partitions may be ranked, and then the median, percentile (given a target percentage value), or order statistics weighted averaging may be applied, where a weight is given to each DNN output based on its rank in all DNN outputs. In yet another embodiment, rank percentage averaging may be performed by ranking the levels of transmission error predicted by DNN outputs of all partitions, and then taking the average of a percentage of the highest levels of transmission error, and thus the partitions that produce low transmission error by the DNN are not counted in the total average. In yet another embodiment, Minkowski summation may be performed by raising each DNN output to a power before summing them together. In yet another embodiment, polynomial combination may be performed by applying a multivariable polynomial function for which the DNN outputs are the variables. In yet another embodiment, a product of exponentials combination may be performed by applying an exponential equation to the DNN outputs and then combine them with a product. In yet another embodiment, a FNN or SVR may be applied, which takes the DNN outputs as inputs and produces an output that predict the overall transmission error, and the FNN or SVR may be trained by labeled data that has ground truth labels of the training samples. The combination may be performed.

Figure 9:
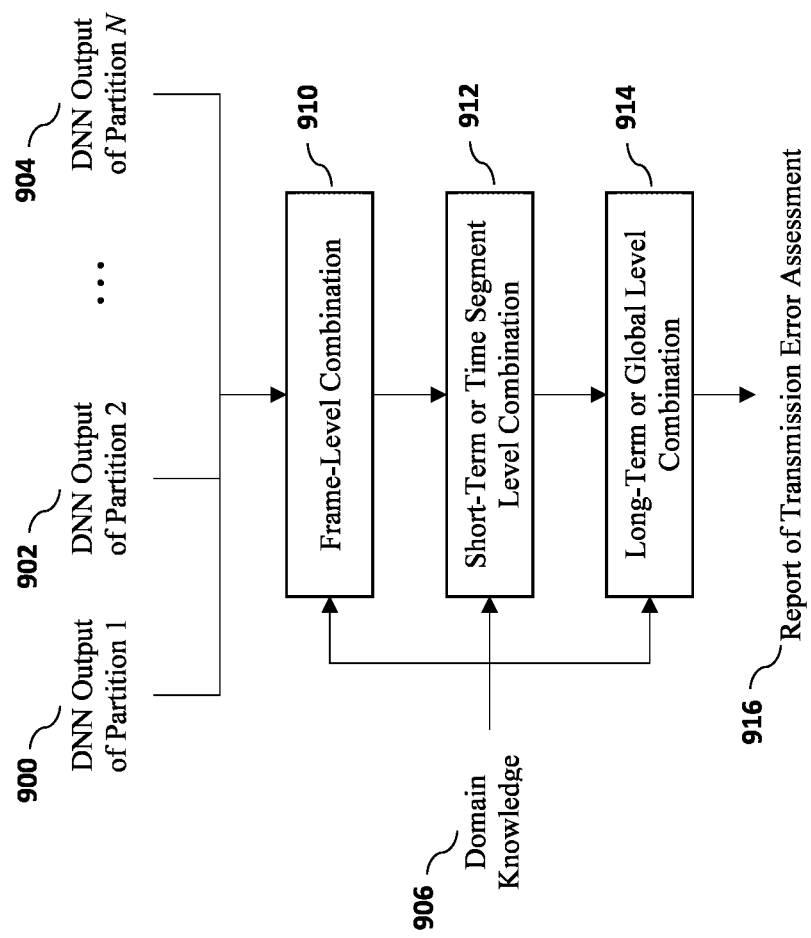
FIG. 9 illustrates the framework and data flow diagram of utilizing domain knowledge to combine DNN outputs of different partitions of the visual media input in three levels: frame-level, short-term time segment level, and long-term or global (i.e., the whole visual median input) level, in accordance with an embodiment of the disclosure.

In accordance with an embodiment of the disclosure, the DNN outputs 900, 902, 904 of all partitions may be combined at multiple levels and produce multiple levels of transmission error assessment 910, 912, 914 to a report of transmission error assessment 916, as illustrated in FIG. 9. The direct DNN outputs 900, 902, 904 may be considered partition-level transmission error assessment. Domain knowledge 210, 906 obtained through content analysis 202, codec analysis 204, distortion analysis 206, and HVS modeling 208, may be used to guide the combination process.

In accordance with an embodiment of the disclosure, the DNN outputs of all partitions within a frame may be combined at frame-level 910 to produce a frame-level assessment for each video frame in terms of the existence of transmission error, the level of transmission error, and the statistics of transmission error. In one embodiment, the statistics of the transmission error may be the frequency and uniformity of transmission error occurrence, and the average and variance of the levels of the transmission errors.

In accordance with an embodiment of the disclosure, the partition-level and frame-level transmission error assessment within a short-term or a time-segment may be combined at short-term or time-segment level 912 to produce a short-term or time-segment-level assessment for each time segment in terms of the existence of transmission error, the level of transmission error, and the statistics of transmission error. In one embodiment, the length of the time segment may be a group-of-picture (GoP) defined in encoder/decoder configurations. In another embodiment, the length of the time segment may be a scene determined by the presented content of the visual media input, and thus different time segments are divided by scene changes. In yet another embodiment, in video adaptive bitrate (ABR) streaming applications such as Dynamic Adaptive Streaming over HTTP (DASH), the length of the time segment may be defined by the time unit or segment defined by the adaptive streaming protocols such as MPEG-DASH, HTTP Live Streaming (HLS), and Microsoft Smooth Streaming, where the typical length is between 1 second to over 10 seconds. In yet another embodiment, the length of the time segment may be defined by any preset time period, such as one second, one minute, one hour, one day, one week, or one month. In one embodiment, the statistics of the transmission error may be the frequency and uniformity of transmission error occurrence, and the average and variance of the levels of the transmission errors.

In accordance with an embodiment of the disclosure, the partition-level, frame-level and short-term time-segment level transmission error assessment collected for a long-term time period or at global level (the whole visual media input) may be combined at long-term or global level 914 to produce a long-term or global level assessment in terms of the existence of transmission error, the level of transmission error, and the statistics of transmission error. In one embodiment, the length of the long-term time period may be defined by any preset time period, such as one year or five years. In another embodiment, the length of time may be global, meaning that the full period of the visual media input is covered. In one embodiment, the statistics of the transmission error may be the frequency and uniformity of transmission error occurrence, and the average and variance of the levels of the transmission errors.

Figure 10:
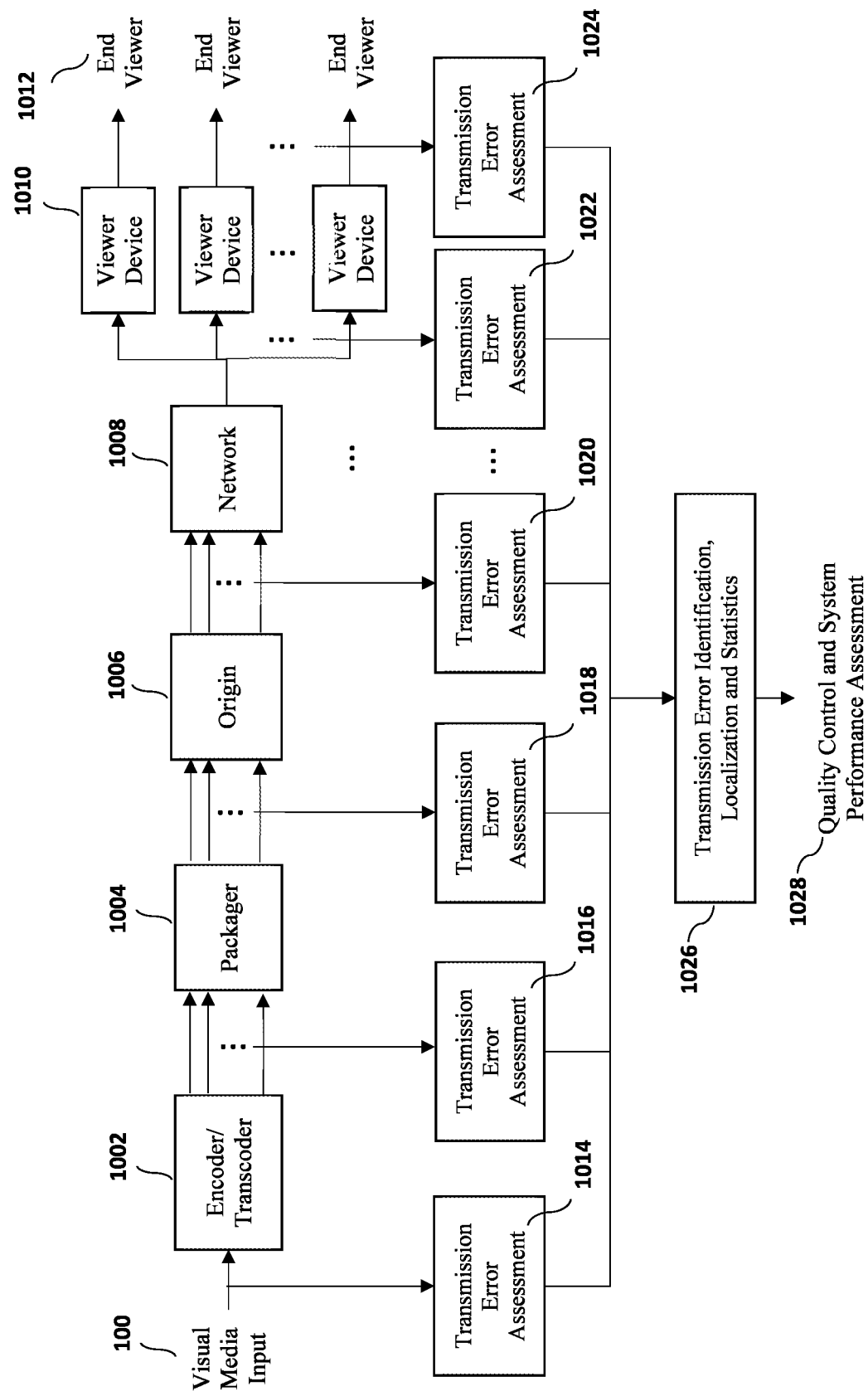
FIG. 10 illustrates an example of a visual communication system and the potential monitoring points where the transmission error assessment method or system may be deployed, collected at a central location and used for quality control and system performance assessment purposes, in accordance with an embodiment of the disclosure.

The transmission error assessment method and system in the disclosure may be applied in many visual media communication systems and networks. In accordance with an embodiment of the disclosure, the transmission error assessment method and system may be applied to visual media distribution networks such as cable, satellite, IPTV, Internet, and content delivery networks (CDNs). An illustrative common and simplified framework is shown in FIG. 10, where the source of the visual media input 1000 passes through many middle stages before it reaches the end viewers, including one or more operations of encoding/transcoding 1002, packaging 1004, storing at origin 1006, distribution through the network 1008, arriving at the viewing devices 1010, and being rendered and seen by end viewers 1012. In one embodiment of the disclosure, the transmission error assessment method and system may be applied at many points in the visual media communication system or network, at the source input or before the encoder/transcoder 1014, after encoder/transcoder or before the packager 1016, after packager or before the origin 1018, after the origin or before the visual media content is sent to the network 1020, during network distribution to viewer devices 1022, and after rendered at the end viewers' devices 1024. Applying the transmission error assessment method and system at a plurality of monitoring points provide a good overview about the performance of the visual media distribution network, and help identify and fix quality problems during video distribution. In one embodiment, this may be done by collecting the outputs of transmission error assessment from a plurality of monitoring points 1014, 1016, 1018, 1020, 1022, 1024 to a central location, performing transmission error identification, localization and statistics 1026, and using the results as a tool for quality control and system performance assessment 1028.

In accordance with an embodiment of the disclosure, the transmission error assessment results collected from a plurality of monitoring points is used to identify and localize the first occurrences of transmission error in the media communication system. In one embodiment, this is done by examining the existence of transmission error from the assessment results from a plurality of monitoring points, and identify the earliest point in the visual media communication delivery chain and visual media communication network. This point is then used to localize the first occurrence of transmission error to be between two modules in the chain, for example, between an encoder/transcoder and a packager, or at the end viewers' viewing devices. When the whole collection of methods and systems (at both individual monitoring points and the central location) have run for a period of time for a stream of visual media input stream, statistics may be performed on the collected data regarding transmission errors. In one embodiment, the statistics may include the frequencies and levels of transmission errors that occur in each of the monitoring points. In another embodiment, in a network that has many end viewers, the statistics may include geological information about the frequencies and levels of transmission error for each particular region. In yet another embodiment, the statistics may include time information about the frequencies and levels of transmission error for each particular time period, for example, morning, noon and primetime of a day, or weekday and weekend of a week. In yet another embodiment, in a network that has many end viewers, the statistics may include device information the frequencies and levels of transmission error for each type of viewing devices.

In accordance with an embodiment of the disclosure, the output at the central location that perform transmission error identification, localization and statistics 1026, may be used for quality control and system performance assessment 1028. In one embodiment, the quality control may be performed by repairing or replacing the components in the visual media communication system that are identified and localized to produce transmission errors. In another embodiment, the quality control may be performed by switching to an alternative device or alternative network path that can avoid utilizing the components in the visual media communication system that are identified and localized to produce transmission errors. In yet another embodiment, the quality control may be performed by allocating more hardware, software, computing, or storage resources in the visual media communication network to the geological regions where transmission errors occur more frequently, or the users of the regions are given higher priority. In yet another embodiment, the quality control may be performed by allocating more hardware, software, computing, or storage resources of the visual media communication network to the time periods where transmission errors occur more frequently, or there is more viewership in the time period. In accordance with an embodiment of the disclosure, the system performance assessment is performed by conducting statistics (for example, the average and variance of transmission frequencies and levels) of the transmission error assessment for different periods of time over different geological regions, and by comparing the statistics under different quality control schemes.

Figure 11:
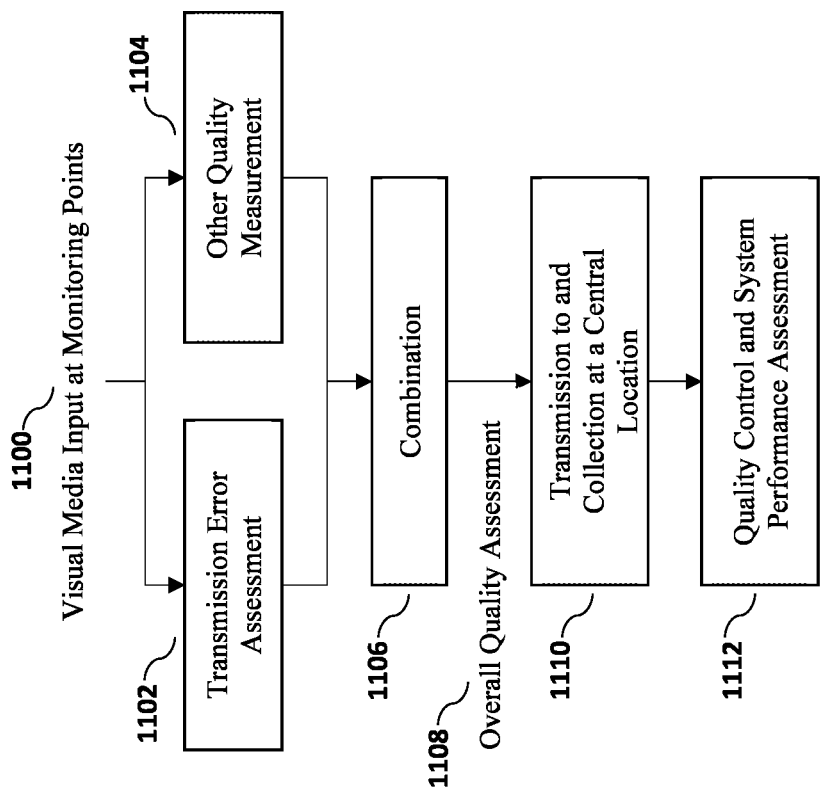
FIG. 11 illustrates an example that in a visual communication system, the visual media inputs are monitored at multiple monitoring points, where transmission error assessment and other quality measurement are performed, collected at a central location and used for quality control and system performance assessment purposes, in accordance with an embodiment of the disclosure.

In accordance with an embodiment of the disclosure, the transmission error assessment method and system may be applied at many monitoring points in the visual media communication system or network as exemplified in FIG. 10. In one embodiment, as illustrated in FIG. 11, while the visual median input at multiple monitoring points 1100 are evaluated for transmission error assessment 1102, other quality measures may also be computed at these monitoring points 1104. Examples of the other quality measures may include error control code based methods [1], packet loss visibility prediction methods [2], full-reference image/video quality assessment methods [3], [4], [5], device adaptive visual quality measures [5], blocking or other artifact detection approaches [6], no-reference image/video quality assessment methods (for example, deep neural network based image/video quality measures), packet loss rate based methods [7], video attention or saliency based methods, visual media streaming quality-of-experience assessment methods such as those based on detection and statistics of video freezing events (including buffering and rebuffering) and quality/bitrate switching events (for example, in dynamic adaptive streaming over HTTP scenarios), video content preference based methods (for example, user likeness scores, and user comfort/discomfort scores), and/or user viewership statistics based method, including statistics on content types, screen resolutions, screen sizes, dynamic ranges (for example, SDR vs HDR) and device types (for example, phone, tablet, laptop, desktop, or TV). The transmission error assessment and these other quality measures may then be combined at the monitoring points 1106. The combination methods may include taking the average, weighted average, median, percentile, order statistics weighted averaging, rank percentage average, Minkowski summation, polynomial combination, product of exponentials, feedforward neural network (FNN), or support vector regression (SVR) methods. The combination creates an overall quality assessment 1108 of the visual media input the monitoring points.

In accordance with an embodiment of the disclosure, the overall quality assessment at the monitoring points may be used for quality control and system performance assessment purposes. In one embodiment, the overall quality assessment of the visual media input at a plurality of monitoring points may be transmitted to a central location 1110, and may be used for quality control and system performance assessment 1112. In one embodiment, problematic components in the visual media communication system are identified and localized where significant quality degradation in terms of the overall quality assessment of the visual median input before and after the components. Quality control may then be performed by repairing or replacing the components, or by switching to an alternative device or alternative network path that can avoid utilizing the problematic components. In another embodiment, the quality control may be performed by allocating more hardware, software, computing, or storage resources in the visual media communication network to the geological regions where the overall quality assessment is low on average, or the users of the regions are given higher priority. In yet another embodiment, the quality control may be performed by allocating more hardware, software, computing, or storage resources of the visual media communication network to the time periods where the overall quality assessment is low, or there is more viewership in the time period. In accordance with an embodiment of the disclosure, the system performance assessment is performed by conducting statistics (for example, the average and variance) of the overall quality assessment for different periods of time over different geological regions, and by comparing the statistics under different quality control schemes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), random access memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] S. Lin and D. J. Costello, Jr., Error Control Coding: Fundamentals and Applications, Prentice Hall, 1983.
[2] A. R. Reibman, S. Kanumuri, V. Vaishampayan and P. C. Cosman, "Visibility of individual packet losses in MPEG-2 video," 2004 International Conference on Image Processing, 2004, Singapore, 2004, pp. 171-174 Vol. 1.
[3] Z. Wang, A. C. Bovik, H. R. Sheikh and E. P. Simoncelli, "Image quality assessment: From error visibility to structural similarity". IEEE Transactions on Image Processing, 13(4), 600-612, 2004.
[4] Z. Wang, E. P. Simoncelli and A. C. Bovik, "Multi-scale structural similarity for image quality assessment". IEEE Asilomar Conference on Signals, Systems and Computers, November 2003.
[5] A. Rehman, K. Zeng and Z. Wang, "Display device-adapted video quality-of-experience assessment," IS&T/SPIE Electronic Imaging: Human Vision & Electronic Imaging, February 2015.
[6] K. Zeng, T. Zhao, A. Rehman and Z. Wang, "Characterizing perceptual artifacts in compressed video streams," IS&T/SPIE Human Vision and Electronic Imaging XIX, San Francisco, CA, February 2014.
[7] J. Greengrass, J. Evans and A. C. Begen, "Not all packets are equal, Part 2: the impact of network packet loss on video quality," in IEEE Internet Computing, vol. 13, no. 2, pp. 74-82, March-April 2009.

What is claimed is:

1. A method for assessing transmission errors in a visual media input, comprising:
   obtaining domain knowledge from the visual media input by content analysis, codec analysis, distortion analysis, and/or human visual system (HVS) modeling;
   dividing the visual media input into partitions;
   passing each partition into deep neural networks (DNNs) that produce DNN outputs indicating a transmission error assessment of the respective partition; and
   combining the DNN outputs of the partitions with the domain knowledge to produce an overall assessment of the transmission errors in the visual media input.

2. The method of claim 1, in obtaining the domain knowledge, further comprising, performing the content analysis by classifying the visual media input into different complexity categories and/or different content type categories.

3. The method of claim 1, in obtaining the domain knowledge, further comprising, performing the codec analysis by classifying the visual media input into different encoder categories and assessing encoding parameters of the visual media input.

4. The method of claim 1, in obtaining the domain knowledge, further comprising, performing the distortion analysis by assessing types and levels of distortion artifacts in the visual media input, and classifying different spatial regions and temporal durations of the visual media input into different distortion categories.

5. The method of claim 1, in obtaining the domain knowledge, further comprising, performing the HVS modeling by assessing the visual media input at one or more of partition, frame, time-segment or global levels in terms of human visual contrast sensitivity, luminance and texture masking effects, and/or visual saliency and attention effects.

6. The method of claim 1, in dividing the visual media input into the partitions, further comprising:
   partitioning the visual media input spatially at each image or video frame into blocks;
   partitioning the visual media input spatially and temporally into three-dimensional blocks; or
   partitioning the visual media input in a multi-channel representation by applying a multi-scale, multi-orientation decomposition transform and dividing the visual media input in the transform domain.

7. The method of claim 6, in partitioning the visual media input in the multi-channel representation, further comprising, using one or more of Fourier transforms, a discrete cosine transform, a wavelet transform, a Gabor transform, a Laplacian pyramid transform, a Gaussian pyramid transform, and a steerable pyramid transform to perform the multi-scale multi-orientation decomposition transform.

8. The method of claim 1, further comprising:
   constructing multiple DNNs, each for one or more categories defined by the domain knowledge;
   selecting the DNN for each partition based on the domain knowledge; and
   passing the partition to the DNN of the best match.

9. The method of claim 1, further comprising:
   constructing multiple DNNs, each for one or more specific content types in terms of content categories and/or complexity categories;
   selecting the DNN for each partition that best matches its content type; and
   passing the partition to the DNN of the best match.

10. The method of claim 1, further comprising:
    constructing multiple DNNs, each for one or more specific encoder categories;
    selecting the DNN for each partition that best matches its encoder category; and
    passing the partition to the DNN of the best match.

11. The method of claim 1, further comprising:
    constructing multiple DNNs, each for one or more specific distortion categories;
    selecting the DNN for each partition that best matches its distortion category; and
    passing the partition to the DNN of the best match.

12. The method of claim 1, in combining the DNN outputs of the partitions with the domain knowledge to produce the overall assessment of the transmission errors in the visual media input, further comprising, using average, weighted average, median, percentile, order statistics weighted averaging, rank percentage average, Minkowski summation, polynomial combination, product of exponentials, feedforward neural network, or support vector regression (SVR) as the combination method.

13. The method of claim 12, in combining the DNN outputs of the partitions, further comprising, using HVS modeling of the visual media input at partition, frame, time-segment and global levels in terms of human visual contrast sensitivity, luminance and texture masking effects, and/or visual saliency and attention, as the weighting and preference factors in the combination method.

14. The method of claim 1, in combining the DNN outputs of the partitions with the domain knowledge to produce the overall assessment of the transmission errors in the visual media input, further comprising, producing multiple levels of combination results of one of more of:

a frame-level combination that assesses existence of transmission error, a level of transmission error, and statistics of transmission error, for individual frames;

a short-term or time-segment level combination that assesses the existence of transmission error, the level of transmission error, and the statistics of transmission error, for individual short-term time segment; or a long-term or global level combination that assesses the existence of transmission error, the level of transmission error, and the statistics of transmission error, for long-term span of time or the visual media input at a whole.

15. The method of claim 1, further comprising:

assessing the transmission errors of a visual media input stream at a plurality of monitoring points in a media communication system;

collecting the transmission error assessment results from a plurality of monitoring points in a central location; and identifying and localizing the first occurrences of transmission error in the media communication system.

16. The method of claim 15, further comprising:

performing quality control based on the localizing of the transmission errors; or conducting statistics and assessing performance of the media communication system in terms of a frequency of transmission error occurrences.

17. The method of claim 1, further comprising:

assessing the transmission errors of a visual media input stream at a plurality of monitoring points in a media communication system;

computing other quality measures of the visual media input at the monitoring points; and combining transmission error assessment with the other quality measures obtained at each monitoring point into an overall quality assessment of the visual media input at the monitoring point.

18. The method of claim 17, further comprising:

collecting the overall quality assessment results from the plurality of monitoring points in the media communication system in a central location;

performing quality control based on the overall quality assessment at the monitoring points; or conducting statistics and assessing performance of the media communication system in terms of the overall quality assessment of the visual media input.

19. A system for assessing transmission errors in a visual media input, comprising, a computing device programmed to:

obtain domain knowledge from the visual media input by content analysis, codec analysis, distortion analysis, and/or human visual system (HVS) modeling;

divide the visual media input into partitions;

pass each partition into deep neural networks (DNNs) that produce DNN outputs indicating a transmission error assessment of the respective partition; and combine the DNN outputs of the partitions with the domain knowledge to produce an overall assessment of the transmission errors in the visual media input.

20. The system of claim 19, wherein the computing device is further programmed to: in obtaining the domain knowledge, perform the content analysis by classifying the visual media input into different complexity categories and/or different content type categories.

21. The system of claim 19, wherein the computing device is further programmed to: in obtaining the domain knowledge, perform the codec analysis by classifying the visual media input into different encoder categories and assessing encoding parameters of the visual media input.

22. The system of claim 19, wherein the computing device is further programmed to: in obtaining the domain knowledge, perform the distortion analysis by assessing types and levels of distortion artifacts in the visual media input, and classifying different spatial regions and temporal durations of the visual media input into different distortion categories.

23. The system of claim 19, wherein the computing device is further programmed to: in obtaining the domain knowledge, perform the HVS modeling by assessing the visual media input at one or more of partition, frame, time-segment and global levels, in terms of one or more of human visual contrast sensitivity, luminance and texture masking effects, and/or visual saliency and attention effects.

24. The system of claim 19, wherein the computing device is further programmed to, in dividing the visual media input into the partitions:

partition the visual media input spatially at each image or video frame into blocks of square, rectangular or other shapes;

partition the visual media input spatially and temporally into three-dimensional blocks of square or rectangular prisms; or partition the visual media input in a multi-channel representation by first applying a multi-scale, multi-orientation decomposition transform and then dividing the visual media input in the transform domain.

25. The system of claim 24, wherein the computing device is further programmed to: in partitioning the visual media input in a multi-channel representation, use one or more of Fourier transforms, a discrete cosine transform, a wavelet transform, a Gabor transform, a Laplacian pyramid transform, a Gaussian pyramid transform, and a steerable pyramid transform to perform the multi-scale multi-orientation decomposition transform.

26. The system of claim 19, wherein the computing device is further programmed to:

construct multiple DNNs, each for one or more categories defined by the domain knowledge;

select the DNN for each partition based on the domain knowledge; and pass the partition to the DNN of the best match.

27. The system of claim 19, wherein the computing device is further programmed to:

construct multiple DNNs, each for one or more specific content types in terms of content categories and/or complexity categories;

select the DNN for each partition that best matches its content type; and pass the partition to the DNN of the best match.

28. The system of claim 19, wherein the computing device is further programmed to:

construct multiple DNNs, each for one or more specific encoder categories;

select the DNN for each partition that best matches its encoder category; and pass the partition to the DNN of the best match.

29. The system of claim 19, wherein the computing device is further programmed to:

construct multiple DNNs, each for one or more specific distortion categories;

select the DNN for each partition that best matches its distortion category; and pass the partition to the DNN of the best match.

30. The system of claim 19, wherein the computing device is further programmed to: in combining the DNN outputs of all partitions with the domain knowledge to produce the overall assessment of the transmission errors in the visual media input, use one or more of average, weighted average, median, percentile, order statistics weighted averaging, rank percentage average, Minkowski summation, polynomial combination, product of exponentials, feedforward neural network, or support vector regression (SVR) as the combination method.

31. The system of claim 30, wherein the computing device is further programmed to: in combining the DNN outputs of all partitions, use HVS modeling of the visual media input at one or more of partition, frame, time-segment or global levels, in terms of human visual contrast sensitivity, luminance and texture masking effects, and/or visual saliency and attention, as the weighting and preference factors in the combination method.

32. The system of claim 19, wherein the computing device is further programmed to: in combining the DNN outputs of the partitions with the domain knowledge to produce the overall assessment of the transmission errors in the visual media input, produce multiple levels of combination results of one of more of:

frame-level combination that assesses existence of transmission error, a level of transmission error, and statistics of transmission error, for individual frames;

short-term or time-segment level combination that assesses the existence of transmission error, the level of transmission error, and the statistics of transmission error, for individual short-term time segment; and long-term or global level combination that assesses the existence of transmission error, the level of transmission error, and the statistics of transmission error, for long-term span of time or the visual media input at a whole.

33. The system of claim 19, wherein the computing device is further programmed to:

assess the transmission errors of a visual media input stream at a plurality of monitoring points in a media communication system;

collect the transmission error assessment results from a plurality of monitoring points in a central location; and identify and localize first occurrences of transmission error in the media communication system.

34. The system of claim 33, wherein the computing device is further programmed to:

perform quality control based on the localizations of the transmission errors; or conduct statistics and assessing performance of the media communication system in terms of a frequency of transmission error occurrences.

35. The system of claim 19, wherein the computing device is further programmed to:

assess the transmission errors of a visual media input stream at a plurality of monitoring points in a media communication system;

compute other quality measures of the visual media input at the monitoring points; and combine transmission error assessment with other the quality measures obtained at each monitoring point into an overall quality assessment of the visual media input at the monitoring point.

36. The system of claim 19, wherein the computing device is further programmed to:

collect the overall quality assessment results from a plurality of monitoring points in a media communication system in a central location;

perform quality control based on the overall quality assessment at the monitoring points; or conduct statistics and assessing performance of the media communication system in terms of the overall quality assessment of the visual media input.

* * * * *